United States Patent [19]

Timmons

[11] 4,429,907
[45] Feb. 7, 1984

[54] PIPE COUPLER

[76] Inventor: Fred A. Timmons, 418 Juniper Ave., Chico, Calif. 95926

[21] Appl. No.: 406,860

[22] Filed: Aug. 10, 1982

[51] Int. Cl.³ .............................................. F16L 17/04
[52] U.S. Cl. .................................... 285/373; 285/156; 285/423; 285/DIG. 16
[58] Field of Search ............... 285/DIG. 16, 373, 419, 285/423, 156; 138/99

[56] References Cited

U.S. PATENT DOCUMENTS

| | | | |
|---|---|---|---|
| 725,610 | 4/1903 | Wossoff | 285/373 |
| 982,028 | 1/1911 | Austin | 285/69 |
| 1,026,211 | 5/1914 | Kissinger | 138/49 |
| 2,169,002 | 8/1939 | Doran | 285/129 |
| 3,133,753 | 5/1964 | Goodman et al. | 285/91 |
| 3,204,668 | 9/1965 | Emerson, Jr. et al. | 138/158 |
| 3,432,188 | 3/1969 | Turner | 285/373 X |
| 3,517,701 | 6/1970 | Smith | 138/97 |
| 3,633,943 | 1/1972 | Ramm | 285/DIG. 16 |
| 3,667,782 | 6/1972 | Viazzi | 285/373 X |
| 3,771,820 | 11/1973 | Ross et al. | 285/373 |
| 4,036,513 | 7/1977 | Lothis et al. | 285/373 X |
| 4,103,943 | 8/1978 | Curtin | 285/419 |
| 4,374,596 | 2/1983 | Schlemmer et al. | 285/419 X |

FOREIGN PATENT DOCUMENTS 547986 11/1954 Belgium ............... 285/373

Primary Examiner—Dave W. Arola
Attorney, Agent, or Firm—Bernard, Rothwell & Brown

[57] ABSTRACT

Complementary elongated members of generally semi-cylindrical cross-section are provided. These members are assembled on pipes to be joined so as to enclose the joint between the pipes, and the members include abutting edges extending lengthwise of the pipes and arranged to be bonded together. The coupler is provided with one or more recesses extending across the abutting edges of the elongated members. Reinforcing elements are received in each of these recesses and extend across the abutting edges for reinforcing the coupler. The reinforcing members are bonded to the surfaces of the recesses and to the elongated members. In one form of the invention spaced lugs are provided on each of the elongated members and extend transversely of the line formed by the abutting edges. The reinforcing members are in a form of flat keys which are received between spaced lugs, extend transversely across the line of the abutting edges and are bonded to the lugs and to the elongated members. In another form of the invention the recesses extend lengthwise of the coupler and are formed by rabbets provided in the elongated members adjacent the abutting edges. A spline is received within each of the recesses, extends lengthwise of the couplers so as to cover the line of the abutting edges, and is bonded to the walls of the recess. The abutting edges of the elongated members may be formed in a variety of interlocking shapes so as to further insure a water-tight seal.

10 Claims, 17 Drawing Figures

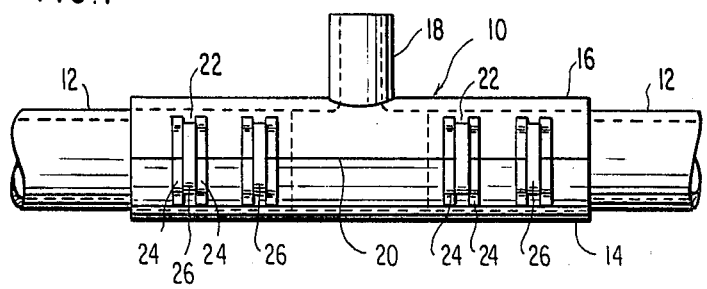
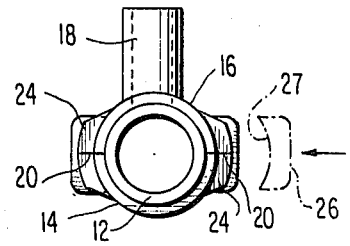
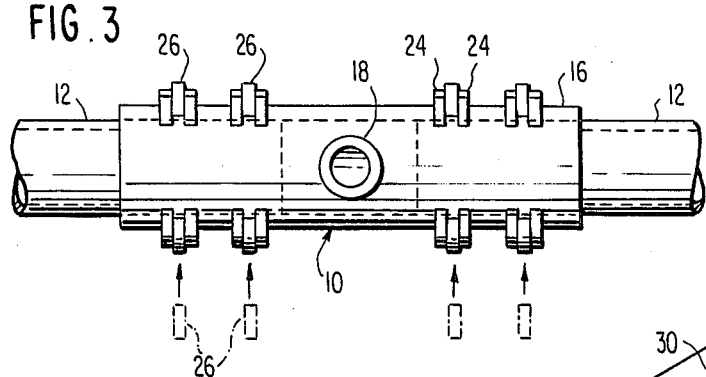
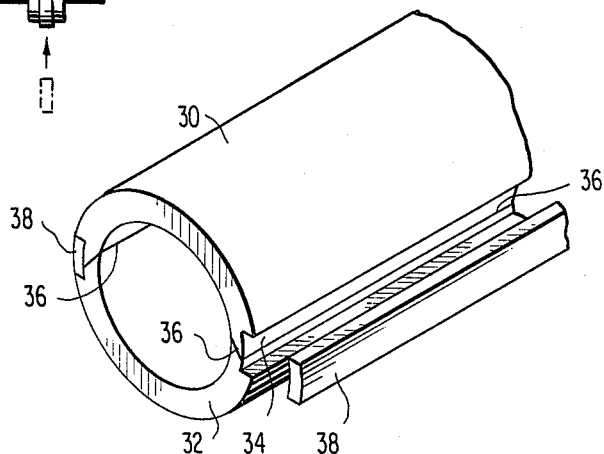
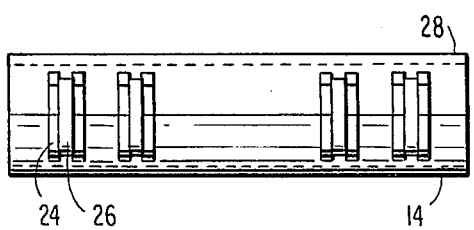
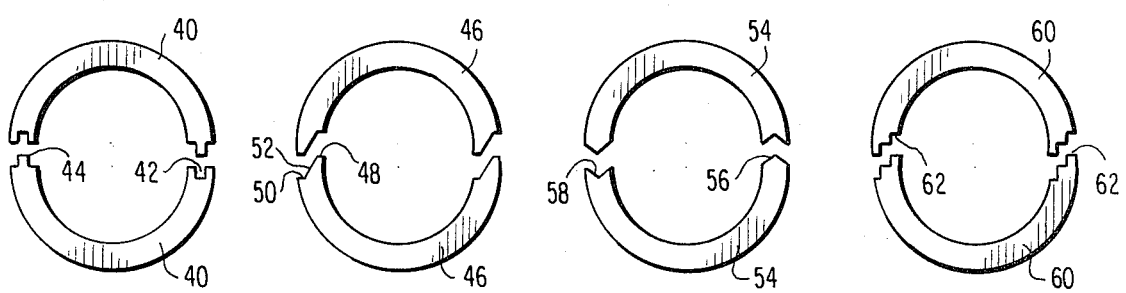

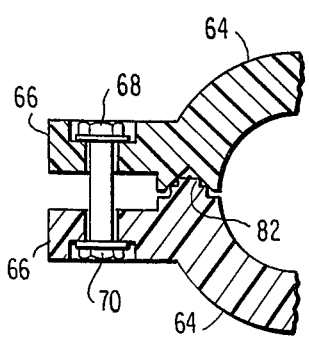
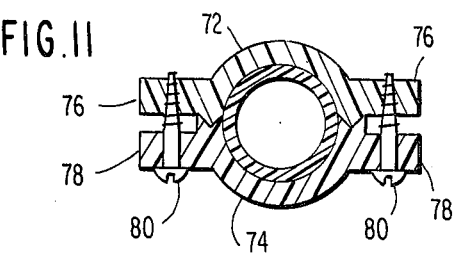
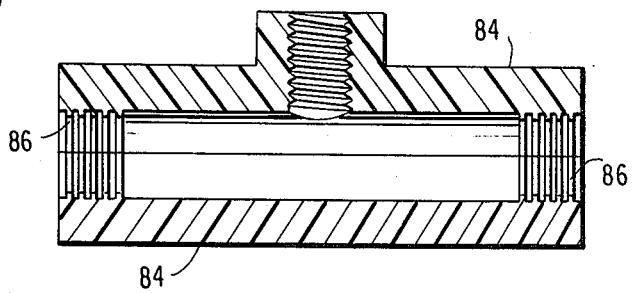
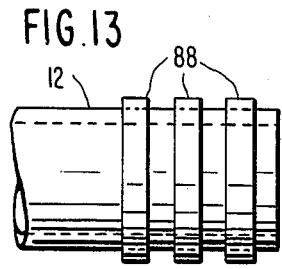
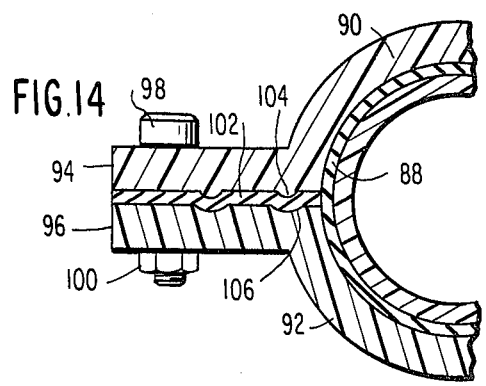
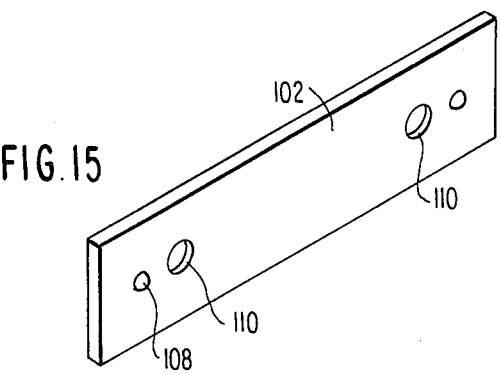
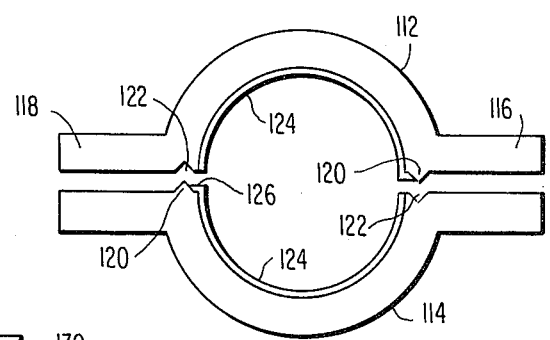
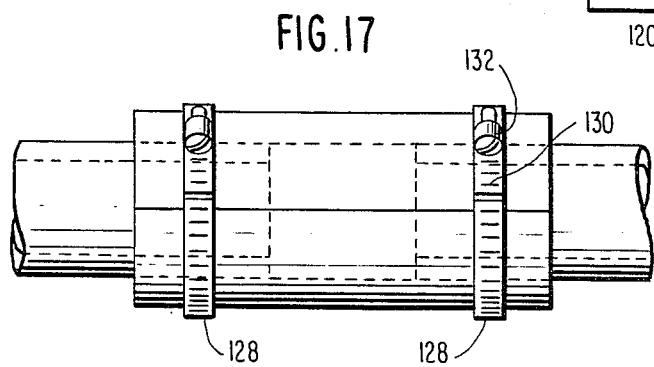

PIPE COUPLER

BACKGROUND OF THE INVENTION

1. Field of the Invention

This invention relates to couplers for joining sections of pipe and more particularly to such couplers for joining or adding to sections of existing pipe where the existing pipe is relatively inaccessible or cannot be removed and replaced without substantial difficulty.

2. Background of the Invention

A wide variety of coupling devices have been developed for joining sections of pipe, including simple screw coupling or couplings which are adhesively-bonded or cemented to the pipe sections to be joined. In some cases pipes are installed in walls or underground or under floors or cement so that such pipes are relatively inaccessible and it would be very expensive to remove and replace such existing pipe. Where leaks occur in such pipe or where it is desired to add to the existing pipe of this type to provide additional outlets, it is desirable to have couplers which can join sections of existing pipe at the point where a leak, for example, has occurred or where it is desired to add additional pipe thereto and which can be incorporated to seal the joint between the pipe sections effectively without disturbing to any substantial extent the existing pipe.

The prior art includes pipe coupling such as that shown in U.S. Pat. No. 4,109,944—Curtin, wherein the coupling is formed of two semicylindrical members arranged to enclose the pipe sections at the junction of the pipe sections so as to provide a water-tight seal. In the form shown in the aforementioned patent the coupling members are made of plastic and are designed to be adhesively-bonded to each other and to the pipe sections by a suitable cement. The two coupling members are formed to provide interlocking elements.

While the device of the aforementioned patent provides an adequate seal under normal conditions, pipes may be subjected to conditions which could rupture a simple seal such as that discussed above. For example, in some cases the pipes may be subjected to extreme changes in temperature which place a strain on bonded junctions of the coupler or they may be subjected to extreme changes in pressure which cause pipe vibration and impose a strain on the bonded junctions.

By the present invention a coupler is provided which has additional strength so that it can effectively resist even extreme changes in temperature or pressure and the resulting strain on the bonded junctions.

It is an object of the present invention, therefore, to provide an improved coupler for repairing broken pipes or adding to existing pipes, particularly where the existing pipe is relatively inaccessible and is difficult or impossible to remove and replace.

It is a further object of this invention to provide an improved coupler for repairing broken pipes or adding to existing pipes, which coupler has additional strength to prevent leakage under conditions of extreme changes in pressure which cause vibrations of the pipe or under conditions of extreme changes of temperature.

SUMMARY OF THE INVENTION

In carrying out the invention, in one form thereof, complementary elongated members of generally semi-cylindrical cross-section are provided. These members are assembled on pipes to be joined so as to enclose the joint between the pipes and the members include abutting edges extending lengthwise of the pipes and arranged to be bonded together in any suitable manner, as by a suitable adhesive. To reinforce the coupler so that it may withstand extreme changes in temperature and pressure the coupler is provided with one or more recesses extending across the abutting edges of the aforementioned semi-cylindrical elongated members. Reinforcing elements are received in each of these recesses and extend across the abutting edges for reinforcing the coupler. The reinforcing members are bonded to the surfaces of the recesses and to the elongated members. In one form of the invention spaced lugs are provided on each of the elongated members and extend transversely of the line formed by the abutting edges. The reinforcing members are in a form of flat keys which are received between spaced lugs, extend transversely across the line of the abutting edges and are bonded to the lugs and to the elongated members. In another form of the invention the recesses extend lengthwise of the coupler and are formed by rabbets provided in the elongated members adjacent the abutting edges. An elongated strip or spline is received within each of the recesses, extends lengthwise of the couplers so as to cover the line of the abutting edges, and is bonded to the walls of the recess. The abutting edges of the elongated members may be formed in a variety of interlocking shapes so as to further insure a water-tight seal.

BRIEF DESCRIPTION OF THE DRAWINGS

For a better understanding of this invention reference may be made to the accompanying drawings in which:

FIG. 1 is a side elevation view of one embodiment of the invention;

FIG. 2 is an end view, partially exploded, of the embodiment shown in FIG. 1;

FIG. 3 is a top view, also partially exploded, of the embodiment shown in FIG. 1;

FIG. 4 is a side view of an embodiment of this invention for joining two sections of pipe;

FIG. 5 is a perspective view of another embodiment of the coupler of this invention, partially exploded;

FIGS. 6, 7, 8 and 9 are end views of the coupler of this invention showing various forms of abutting edges;

FIG. 10 is a partial end view of another embodiment of this invention showing a different construction of the abutting edges and illustrating clamping means for holding the coupler sections together;

FIG. 11 illustrates another form of clamping means which may be used with the coupler of this invention;

FIG. 12 is a view of another embodiment of this invention showing a different construction of the inner surface of the ends of the coupler for engaging the sections of pipe to be joined;

FIG. 13 illustrates seals which may be employed with any of the couplers of this invention;

FIG. 14 is a sectional view of a coupler which may be made in accordance with this invention, utilizing the sealing bands shown in FIG. 13 and sealing strips between the flanges of the coupler;

FIG. 15 is an isometric view of one of the sealing strips shown in FIG. 14;

FIG. 16 is a sectional view of another modified form of this invention;

FIG. 17 is an elevation view of still another modified form of this invention, showing another clamping arrangement for holding the coupler in engagement with pipe sections.

DESCRIPTION OF THE PREFERRED EMBODIMENTS

Referring first to FIG. 1 there is shown an embodiment 10 of the coupler of this invention in assembled position for joining two sections of pipe 12. The coupler includes two elongated complementary semi-cylindrical members, a lower member 14 and an upper member 16. In the embodiment shown in FIG. 1 the upper member 16 includes an upwardly extending tee connection 18 for permitting the connection of an additional pipe line thereto. Where only two sections of pipe are to be joined by the coupler, this tee connection 18 would not be included, as shown in the embodiment illustrated in FIG. 4.

As can be best seen in FIG. 2, the coupler members 14 and 16 are arranged to embrace the pipe 12, the members 14 and 16 engaging each other along their abutting edges 20. Any suitable adhesive cement, that is any adhesive cement which is suitable for joining the edges of the material of which the coupler members 14 and 16 are formed, may be employed. For example, where the coupler members 14 and 16 are made of polyvinyl chloride (PVC) the adhesive cement may be a medium bodied, fast-set polyvinyl chloride. While, for simple installations reliance may be placed on coupler members which are formed in the manner thus far described and which are joined by a suitable adhesive cement at the abutting edges, many installations of this type are subject to extreme changes in temperature which place a strain on the abutting edges of the coupler or they may be subjected to extreme changes in pressure which cause pipe vibration and also impose a strain on the bonded edges.

In accordance with the present invention a coupler is provided which maintains an effective leak-proof joint even under extreme changes of temperature and pressure. Thus, in the embodiment shown in FIG. 1 the coupler members 14 and 16 are formed to provide recesses 22 extending transversely of the line of the abutting edges 20. In the embodiment shown in FIG. 1 the recesses 22 are provided by spaced transversely extending lugs 24, one or more pairs of spaced lugs being provided on each side of the coupler members 14, 16 in order to provide the additional strength sufficient to withstand extremes of pressure and temperature. A key 26 is positioned between each pair of spaced lugs 24, the key 26 extending transversely across the line of the abutting edges 20. Each key 26 is formed with a thickness that is approximately equal to the spacing between the lugs of each pair so as to provide tight engagement with the adjacent surfaces of these lugs. The inner surface of the key is arcuate in shape, as shown at 27 in FIG. 2, the curvature of the surface 27 corresponding to the curvature of the exterior walls of the coupler members 14, so that the arcuate surface of the key engages the exterior walls of the coupler members along the full extent of this arcuate surface.

It can be seen, particularly by reference to FIGS. 1 and 2, that the keys 26 are positioned so as to extend across the abutting edges, thereby providing additional strength and assuring that the coupler members remain in firm bonded engagement with each other and with the pipe even when the coupler is subjected to extremes of temperature and pressure.

In assembling the coupler of this invention to sections of pipe to be joined, a suitable adhesive cement first applied to the abutting edges 20 of the coupler members 14, 16 and to the inner surfaces of the coupler members near each of the longitudinal ends thereof. The two semi-cylindrical coupler members 14, 16 are then assembled on the sections of pipe 12 to be joined and held firmly together until the adhesive cement has set and permanently bonded the coupler members together and to the pipe 12. The coupler members may be held in assembled relation during the setting of the adhesive cement by simple hand pressure or by any suitable clamping means. In order to mix the adhesive cement and insure thorough coating of the surfaces to be joined the coupler elements may be given a twist during this assembly process.

After the coupler members have been assembled on the pipe, adhesive cement is applied to the facing surfaces of the lugs 24 and to the walls of the coupler members 14, 16 in the recesses 22 between the lugs 24. Adhesive cement is similarly applied to the arcuate surface and to the side walls of the key 26 and the key is then inserted between the spaced lugs. Since the spacing of the lugs of each pair is essentially the same as the thickness of the key, the key firmly engages the facing surfaces of the lugs and is bonded thereto. Because the arcuate surface 27 of the key corresponds in curvature to the exterior walls of the coupler members, the arcuate surface of the key is also bonded to the exterior walls over the full extent of the surface 27 as the adhesive cement sets. Each key 26 extends transversely across the abutting longitudinal edges of the coupling members 14, 16 and thereby effectively reinforces the coupler so that it is able to resist extremes of temperature and pressure.

In the embodiment shown in FIGS. 1, 2 and 3, the upper coupler member 16 is formed with a tee connection 18 so as to permit the connection of an additional line to the existing line. If no such additional line is required in a given installation and it is merely desired to join two sections of pipe, the coupler may be formed as shown in FIG. 4. The coupler of FIG. 4 is in all respects the same as that shown in FIGS. 1, 2 and 3 with the single exception that the upper coupler member 28, which corresponds to the upper member 16 in the embodiment of FIGS. 1–3, is formed identical to a lower member 14 and does not include the tee 18.

In FIG. 5 there is shown another embodiment of this invention which includes a reinforcing structure extending across the line of the abutting edges and extending longitudinally along the full length of the coupler. The upper and lower coupler members 30 and 32, respectively, are formed with a rabbet along their abutting longitudinal edges to form a longitudinally extending recess 34. As shown in FIG. 5 this recess extends across the line 36 of the abutting edges of the coupler members 30, 32. In order to reinforce the coupler and enable it to withstand extremes of temperature and pressure, two elongated members or splines 38 are provided, one such member being provided for each of the recesses formed by the aforementioned rabbetting. Dimensionally, each spline 38 is made of a length corresponding to the length of the recess 34. Its circumferential width corresponds to the circumferential width of the recess 34. The thickness of the spline 38 is substantially the same as the depth of the recess 34.

In assembling the coupler members 30, 32 to the pipe to be joined, the abutting edges 36 and the inner surfaces of the coupler members near the longitudinal ends thereof are coated with adhesive cement. Similarly the ends of the pipes 12 to be joined are coated with adhesive cement. The coupler members 30, 32 are assembled on the pipes to be joined and may be twisted, as described above, to insure a thorough mixing of the adhesive cement and a thorough coating of the surfaces to be joined. The coupler members may be held in assembled position with hand pressure or with a suitable clamp until the adhesive cement has set sufficiently to bond the abutting edges of the coupler members together and to bond the coupler members to the pipes. Thereafter, the walls of the recesses 34 and the corresponding edges of the splines 38 are coated with adhesive cement and the splines are then fitted in the recesses and bonded thereto. When bonded, the splines extend across the line of the abutting edges of the coupler members 30, 32 and thereby provide additional strength, enabling the coupler to resist extremes of temperature and pressure.

The abutting edges of the coupler members may be formed in a variety of shapes to provide a greater extent of joining surfaces and better sealing. Several alternative shapes are shown in FIGS. 6, 7, 8 and 9. In FIG. 6 complementary coupler members 40 are each formed at one longitudinal edge with a recess 42 and at the opposite edge with a tongue 44. In one assembled position each tongue 44 is received in a corresponding recess 42 to provide an effective connection and seal. In the embodiment shown in FIG. 7 each coupler member 46 is formed in cross-section to include flat portions 48, 50 at the inner and outer edges thereof. These flat portions are connected by an inclined intermediate portion 52. In the assembled relationship the shape of the abutting edges provides additional joining surface, thereby assisting in more effective bonding.

In the embodiment shown in FIG. 8 coupler members 54 each include at one edge thereof a triangular tongue 56 and at the other edge a complementary triangular-shaped recess 58. In the assembled position the tongues 56 are received in the recesses 58 to assist in effective bonding.

In the embodiment shown in FIG. 9 the complementary edges of the coupler members 60 are formed in stair-step fashion, as shown at 62, to provide an extended interlocking surface for effective bonding.

In the embodiments thus far described it has been contemplated that the two coupler members will be held together by hand or by a temporary clamp until the bonding has been completed. If desired, the coupler members may include permanent external clamps, as shown in FIG. 10. As there shown each coupler member 64 includes an outwardly extending flange 66. While only half of the coupler is shown in FIG. 10 it will be understood that the other half is identical in construction and similarly includes outwardly extending flanges 66. A bolt 68 is received in aligned holes in the flanges 66 and a nut 70 is provided for engaging the bolt 68 to provide effective clamping pressure.

In FIG. 11 there is shown another form of permanent clamping arrangement which may be employed in lieu of that shown in FIG. 10. The embodiment shown in FIG. 11 includes coupler members 72 and 74. The coupler member 72 includes outwardly extending flanges 76 at opposite sides thereof, and the coupler member 74 similarly includes flanges 78. Each flange 78 is formed to include a passage therethrough for receiving a screw 80. The flanges 76 each include a threaded opening to receive the threaded ends of the screws 80 so that as the screws are tightened the coupler members are effectively clamped together to assist in bonding and sealing.

In the forms of invention thus far described, the abutting edges are formed as generally smooth surfaces of various shapes. In the embodiment shown in FIG. 10 a plurality of longitudinally extending spaced ridges 82 are provided on one or both of the abutting edges to provide a modified form of sealing engagement. It will be understood that similar ridges can be formed if desired on abutting edges of different shapes for example on the abutting edges shown in FIGS. 1-9.

In a similar manner, as shown in FIG. 12, the inner surfaces of the coupler members 84, there illustrated, may be formed to include a plurality of longitudinally-spaced circumferentially extending ridges 86 for providing a labyrinth seal and further assisting in the bonding and in the resistance to leakage at the engaging portions of the coupler and the pipes to be joined.

As shown in FIGS. 13-15, additional sealing elements may be employed with the couplers of this invention in order to provide still more effective sealing against leakage. The sections of pipe to be joined by the coupler, one of which is shown at 12 in FIG. 13, may have applied to the exterior wall thereof near the end of the pipe section a plurality of spaced sealing bands 88. The bands may be formed of any suitable resilient, compressible material, for example neoprene. While in the form shown in FIG. 13 separate spaced sealing bands 88 are disclosed, an integral sealing structure may be provided, if desired, by providing connecting webs between the sealing bands 88. When the coupler elements are applied to the end of the pipe section, in the manner described above, the sealing bands 88 provide a further safeguard against leakage from the pipes. If desired, the sealing band structure could be provided on the interior wall of the coupler in lieu of being placed on the pipe.

As shown in FIG. 14, the coupler may be formed of two coupling members 90 and 92, having flanges 94 and 96, respectively, extending outwardly therefrom. The coupling members 90, 92 are held in clamping relationship by clamping elements which comprise bolts 98 and nuts 100, the bolts passing through aligned openings in the flanges 94, 96, as in the form of invention shown in FIG. 10. To seal the area between the flanges, a sealing strip 102 is placed between each pair of flanges and the adjacent surfaces of the flanges 94, 96 are provided with complementary projections 104 and recesses 106 between which the sealing strip 102 is squeezed. Like the sealing bands 88, the sealing strip 102 may be formed of any suitable resilient compressible material, for example, neoprene. In order to hold the sealing strips 102 in position during assembly and clamping of the coupler, each sealing strip, as shown in FIG. 15 is provided with one or more protrusions 108, each of which is pressed into a similarly shaped recess in the adjacent flange. As in the case of FIG. 10, FIG. 14 shows only half of the coupler, but it will be understood that the other half, which is not illustrated, is the same. As shown in FIG. 15, each sealing strip also includes holes 110 for receiving the clamping members, such as the bolts 98.

While in the form illustrated, the sealing bands 88 and the sealing strip 102 are formed as separate components, they may be formed as one integral structure, the bands as mentioned earlier being connected by webs and the sealing strips being formed integrally with the band structure.

The form of pipe coupler shown in FIG. 16 includes mating coupler members 112 and 114, each of these coupler members including a flange 116 extending from one side of the coupling member and a second flange 118 extending from the opposite side. As shown, the flange 116 includes a V-ridge 120 extending longitudinally of the coupler and the flange 118 includes a corresponding V-shaped longitudinal recess 122. Within the interior of each of the coupler members is arranged a sealing member 124 which includes an arcuate portion comprising a plurality of sealing bands, which may be similar to those shown in FIG. 13, and which normally include connecting webs between the spaced bands. The arcuate portion may be formed as relatively narrow spaced ridges rather than the flat bands shown in FIG. 13. Usually, four or more such sealing bands or ridges are employed. Each of the sealing members 124 includes an outwardly extending lip 126 which extends along the face of the corresponding flange and abuts the side of the V-ridge 120. When the coupler is assembled in clamping position, the lip 126 is pressed against the face of the opposite flange to effect a seal.

In order to hold the two coupler members 112 and 114 in sealing engagement with the pipe sections to be joined and with each other, fastening members in the form of bolts and nuts (not shown) corresponding generally to the bolt 68 and nut 70 shown in the form of invention illustrated in FIG. 10 may be employed extending through the flanges.

In order to effect a still more satisfactory seal, the V-ridge 120 is made slightly larger than the V-shaped recess 122. For example, the dimensions of the V-ridge may be 0.001 inch larger than the dimensions of the V-shaped recess. Further, the V-ridge may be set slightly off-center of the V-shaped recess, creating a side pressure on the V's for a still more effective seal.

In lieu of the fastening devices comprising nuts and bolts as described in connection with FIG. 16, the coupler members may be held in engagement with each other and with the pipe sections by means of clamping bands 128, as illustrated in FIG. 17. The embodiment shown in FIG. 17 is constructed with internal sealing members as shown in FIG. 16, and includes corresponding V-ridges and V-shaped recesses, but the flanges shown in FIG. 16 are eliminated and the clamping is accomplished by means of the clamping bands shown. The clamping bands 128 are conventional clamps employed, for example, in clamping automobile hoses, and include a plurality of slots 130 and a screw member 132 for effecting a proper tightening of the clamping band.

While specific embodiments of this invention have been shown and described, the invention is not limited to these specific embodiments, and it is intended to cover by the appended claims all modifications of the invention coming within the spirit and scope of the invention.

It is claimed:

1. A pipe coupler for forming a water-tight seal on an existing pipe comprising:
   (a) first and second elongated complementary members of generally semi-cylindrical cross-section, said members having abutting edges and being arranged to enclose a leak or joint in the existing pipe;
   (b) said first and second members including a plurality of spaced lugs projecting from the walls of said members and extending transversely of said abutting edges, the space between each pair of said lugs on said first and second members being aligned and providing a recess having opposing faces and said recess extending across said abutting edges;
   (c) reinforcing elements received in each of said recesses and extending across said abutting edges for reinforcing said coupler, each of said reinforcing elements having a constant thickness over its entire extent measured in the direction transverse to said faces and being approximately equal to the spacing between adjacent lugs and each of said reinforcing elements having tight engagement with the opposed faces of said spaced lugs; and
   (d) means for holding said reinforcing elements in said recesses and for causing said abutting edges to adhere to each other.

2. The pipe coupler of claim 1 wherein each of said reinforcing elements is a key received in the space between said spaced lugs and extending across said abutting edges.

3. The pipe coupler of claim 2 wherein said means includes an adhesive material and each of said keys is bonded to said lugs by said adhesive material.

4. The pipe coupler of claim 2 wherein each of said keys is shaped to include an arcuate face having a curvature corresponding to that of the exterior walls of said members and said means includes an adhesive material whereby said arcuate surface may be bonded to said walls by said adhesive material.

5. The pipe coupler of claim 1 wherein a plurality of longitudinally extending ridges are formed on the abutting faces of said abutting edges.

6. The pipe coupler of claim 1 wherein a plurality of spaced circumferential ridges are formed on the interior walls of said members adjacent the ends thereof.

7. The pipe coupler of claim 1 including flanges extending from each of said members adjacent said abutting edges, and means engaging said flanges for pressing said edges into firm engagement, and further including circumferentially extending sealing bands disposed against the interior walls of said members and outwardly extending sealing strips disposed between said flanges.

8. The pipe coupler of claim 1 wherein;
   each of said members has on one abutting edge thereof of V-shaped ridge and on the opposite abutting edge thereof a V-shaped recess, the V-shaped ridge on one of said members being received in the V-shaped recess of the other of said members; and
   each of said members has on the interior wall thereof a sealing element comprising a plurality of axially spaced bands, each of said sealing elements also including a lip extending along said one face of the member and terminating adjacent said V-shaped ridge.

9. A pipe coupler for forming a water-tight seal on an existing pipe comprising:
   (a) first and second elongated complementary members of generally semi-cylindrical cross-section, said members having abutting edges and being arranged to enclose a leak or joint in the existing pipe;
   (b) said members being rabbetted along their abutting edges to provide longitudinal recesses extending across said abutting edges;
   (c) an elongated reinforcing element received in each of said recesses and extending across said abutting edges;
   (d) said reinforcing elements having a width substantially equal to the width of said recesses and a thickness substantially equal to the depth of said recesses, said reinforcing elements being bonded to the walls of said recesses by adhesive material, said adhesive material and reinforcing elements providing the sole means to hold the edges in abutment.

10. A pipe coupler for forming a water-tight seal on an existing pipe comprising:
 (a) first and second elongated complementary members of generally semi-cylindrical cross-section, said members having abutting faces and being arranged to enclose a leak or joint in an existing pipe;
 (b) each of said members including two laterally extending flanges;
 (c) means engaging said flanges to hold said members in firm engagement with said pipe;
 (d) one of said flanges of each of said members having a longitudinally extending V-shaped ridge thereon and the other flange having a complementary longitudinally extending V-shaped recess therein, the ridge on one of said flanges being received in the recess on the other of said flanges, said ridges and said flanges being spaced from the semi-cylindrical portion of said members;
 (e) each of said members having on the interior wall thereof a plurality of axially spaced arcuate ridges, each of said arcuate ridges being extended along said one of said flanges and terminating adjacent said V-shaped ridge.

* * * * *

UNITED STATES PATENT AND TRADEMARK OFFICE
CERTIFICATE OF CORRECTION

PATENT NO. : 4,429,907

DATED : February 7, 1984

INVENTOR(S) : Fred A. Timmons

It is certified that error appears in the above-identified patent and that said Letters Patent is hereby corrected as shown below:

Column 1, line 14, "coupling" should read --couplings--.

Column 8, line 42, "of" should read --a--.

Signed and Sealed this

Fifteenth Day of May 1984

[SEAL]

Attest:

Attesting Officer

GERALD J. MOSSINGHOFF

Commissioner of Patents and Trademarks